(12) United States Patent
Moriyama et al.

(10) Patent No.: US 6,830,313 B2
(45) Date of Patent: Dec. 14, 2004

(54) INFORMATION PROCESSING APPARATUS, PRINTING APPARATUS AND SYSTEM, METHODS OF CONTROLLING SAME, AND PROGRAM FOR SAID METHODS

(75) Inventors: Jiro Moriyama, Kanagawa (JP); Yuji Hamasaki, Kanagawa (JP); Yoshinori Nakagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 31 days.

(21) Appl. No.: 10/281,183

(22) Filed: Oct. 28, 2002

(65) Prior Publication Data

US 2003/0081031 A1 May 1, 2003

(30) Foreign Application Priority Data

Oct. 30, 2001 (JP) ........................................ 2001-333350
Oct. 17, 2002 (JP) ........................................ 2002-303458

(51) Int. Cl.[7] .............................. B41J 2/145; B41J 2/15; B41J 29/393
(52) U.S. Cl. ........................................... 347/41; 347/19
(58) Field of Search .............................. 347/41, 43, 15, 347/40; 358/1.18, 1.1, 1.9

(56) References Cited

U.S. PATENT DOCUMENTS

| 4,313,124 A | 1/1982 | Hara | 347/57 |
|---|---|---|---|
| 4,345,262 A | 8/1982 | Shirato et al. | 347/10 |
| 4,459,600 A | 7/1984 | Sato et al. | 347/47 |
| 4,463,359 A | 7/1984 | Ayata et al. | 347/56 |
| 4,558,333 A | 12/1985 | Sugitani et al. | 347/65 |
| 4,608,577 A | 8/1986 | Hori | 347/66 |
| 4,723,129 A | 2/1988 | Endo et al. | 347/56 |
| 4,740,796 A | 4/1988 | Endo et al. | 347/56 |
| 5,721,581 A * | 2/1998 | Saito et al. | 347/249 |
| 5,739,828 A | 4/1998 | Moriyama et al. | 347/9 |
| 5,790,150 A * | 8/1998 | Lidke et al. | 347/41 |
| 6,084,606 A | 7/2000 | Moriyama | 347/19 |
| 6,128,098 A | 10/2000 | Kamada et al. | 358/1.8 |
| 6,595,611 B1 * | 7/2003 | Ruffino | 347/5 |

FOREIGN PATENT DOCUMENTS

| JP | 54-56847 | 5/1979 |
|---|---|---|
| JP | 59-123670 | 7/1984 |
| JP | 59-138461 | 8/1984 |
| JP | 60-71260 | 4/1985 |
| JP | 11-227181 | 8/1999 |

* cited by examiner

*Primary Examiner*—Thinh Nguyen
(74) *Attorney, Agent, or Firm*—Fitzpatrick, Cella, Harper & Scinto (57) ABSTRACT

Based upon a designated printing mode of a printer, a raster-data creation unit or a direct-data (or column-data) creation unit creates raster data, which corresponds to a print raster, or direct (or column) data, which corresponds to nozzles used on the printhead of a printer, as print data delivered to the printer. The print data created is transmitted to the printer from a transmitting unit.

37 Claims, 7 Drawing Sheets

INFORMATION PROCESSING APPARATUS, PRINTING APPARATUS AND SYSTEM, METHODS OF CONTROLLING SAME, AND PROGRAM FOR SAID METHODS

FIELD OF THE INVENTION

This invention relates to an information processing apparatus for outputting print data to a printing apparatus that forms an image using a printhead having a plurality of nozzles arrayed in a sub-scan direction, a printing apparatus, a printing system, methods of controlling the apparatus and system, and programs for implementing these methods.

BACKGROUND OF THE INVENTION

Ink-jet printing is utilized widely in printers, copiers and the like because the apparatus produces little noise, operates at low running cost and is easy to reduce in size.

By way of example, the specification of Japanese Patent Application Laid-Open No. 11-227181 discloses a printing method that employs a printing apparatus for forming an image by repeatedly scanning, in main- and sub-scan directions, a printhead having a plurality of nozzles arrayed in the sub-scan direction. This method uses a printing mode (referred to as a "direct mode") in which print data corresponding to the nozzles used is transmitted from a host device to the printing apparatus so that the printing apparatus may print the data. Further, with this printing method, the processing capability of the host is utilized to the maximum degree. In particular, the host also executes H/V conversion processing (processing for converting horizontal print data to vertical print data), whereby print data arrayed in the horizontal direction is converted to print data for making the data conform to the vertically arrayed row of printhead nozzles.

With the prior art described above, printing by the above method is satisfactory only if the host apparatus used has a high processing capability. If the host does not having a high processing capability, processing by the host requires an extended period of time and there are cases where the printing speed of the overall system declines as a result.

SUMMARY OF THE INVENTION

Accordingly, an object of the present invention is to provide an information processing apparatus that makes it possible to raise the overall processing speed of a printing system comprising the information apparatus and a printing apparatus, and to provide the printing apparatus, the printing system, methods of controlling these apparatus and system, and programs for implementing these methods.

According to the present invention, the foregoing objects are attained by providing an information processing apparatus for outputting print data to a printing/apparatus that forms an image using a printhead having a plurality of nozzles disposed in a sub-scan direction, comprising:

creating means for creating raster data corresponding to a print raster or direct (or column) data corresponding to nozzles used on the printhead of the printing apparatus, as print data delivered to the printing apparatus, based upon a designated printing mode of the printing apparatus; and transmitting means for transmitting the print data, which has been created by the creating means, to the printing apparatus.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will now be described in detail with reference to the accompanying drawings.

(First Embodiment)

Figure 1:
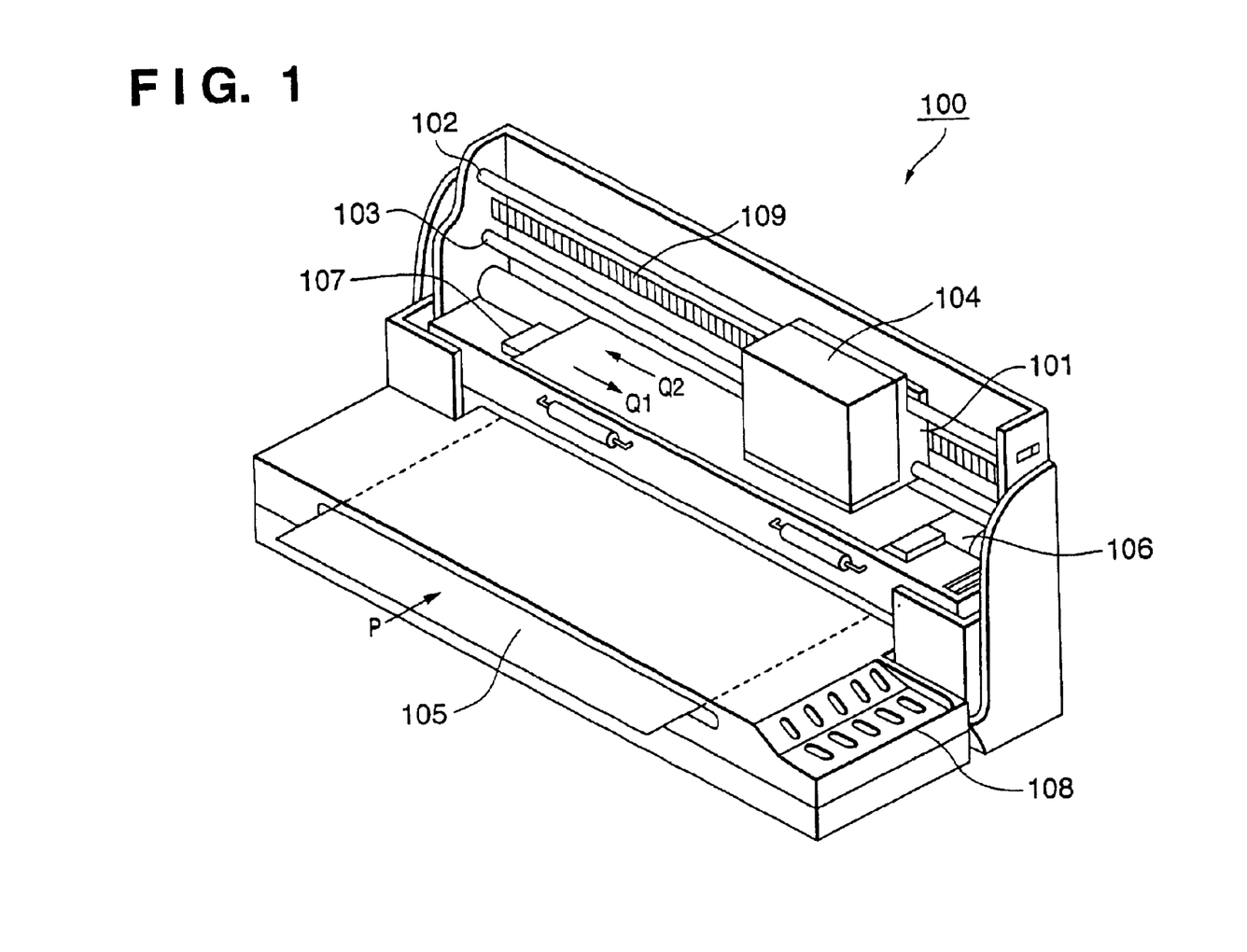
FIG. 1 is a perspective view schematically illustrating a printer, which is an ink-jet printing apparatus to which the present invention is applicable.

FIG. 1 is a perspective view schematically illustrating a printer, which is an ink-jet printing apparatus 100 to which the present invention is capable of being applied.

This ink-jet printer is illustrated as being capable of performing both color printing and black-and-white monochrome printing. However, in cases where the printer is considered as being exclusively for black-and-white monochrome printing, the apparatus will take on a structure in which only nozzles that eject black ink, described below, are disposed on the printhead.

As shown in FIG. 1, a printing medium 105 that has been inserted at a paper feed position of the printing apparatus 100 is fed in the direction of arrow P by rotation of a feed roller 106 and is transported to an area in which printing can be performed by a printhead 104. A platen 107 is provided beneath the printing medium 105 in the printing area. A carriage 101, on which the printhead 104 is mounted, is capable of being moved back and forth by two guide shafts 102 and 103 along the axial direction of these shafts. As a result, by drive supplied by a motor (not shown), a scanning area that includes the printing area is scanned back and forth in directions indicated by arrows Q1 and Q2, namely the horizontal-scan direction.

The printhead 104 mounted on the carriage 101 in FIG. 1 includes orifices capable of discharging ink, and an ink tank capable of accommodating the ink. Further, the printhead 104 is mounted on the carriage 101 in such a manner that the orifices of the printhead 104 perform printing by ejecting ink toward the printing medium situated below.

The printing apparatus 100 includes a control console 108 having a switch unit and a display unit. The switch unit is used to turn the power supply of the apparatus on and off and to set various printing modes. The display unit is adapted so as to be capable of displaying the status of the printing apparatus 100.

A linear encoder 109 having slits at a 600-dpi pitch is provided in back of the carriage 101. A mechanical section 405 (see FIG. 3) has a carriage motor operated by a machine controller 404, whereby the carriage 101 is caused to scan back and forth along the main-scan direction (indicated by arrows Q1, Q2 in FIG. 1).

In the first embodiment, the carriage motor is a DC motor. In an ordinary printing operation, the position or travelling velocity of the carriage 101 is sensed by an optical sensor in back of the carriage 101 utilizing the linear encoder 109, and the scanning speed of the carriage 101 is held constant by DC servo control.

The placement of the nozzles in the printhead 104 will be described with reference to FIG. 2.

Figure 2:
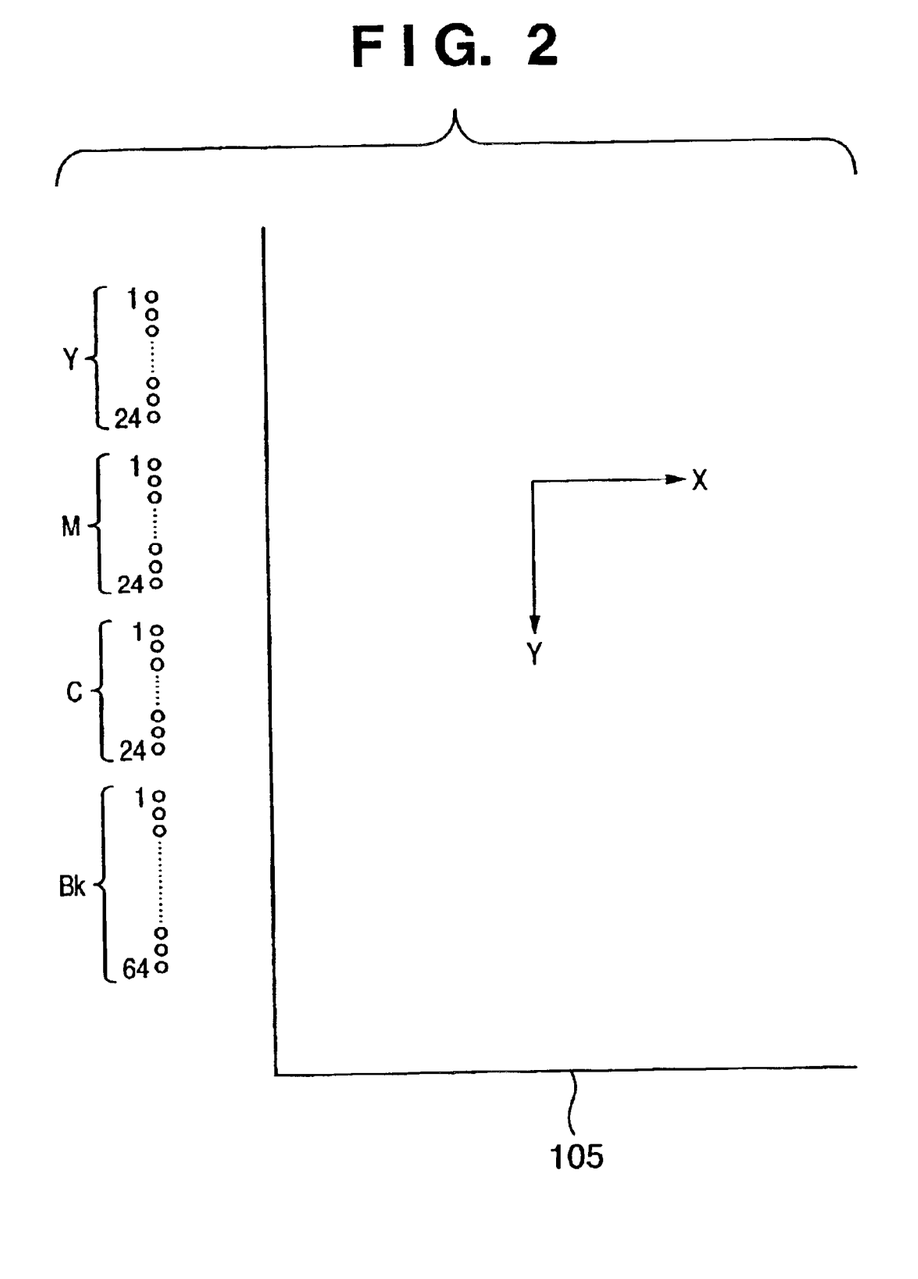
FIG. 2 is a diagram illustrating the placement of nozzles in a printhead according to a first embodiment of the invention.

FIG. 2 is a diagram illustrating the placement of nozzles in the printhead according to the first embodiment.

The printhead 104 has nozzles capable of ejecting inks of a plurality of colors, namely yellow (Y), magenta (M), cyan (C) and black (Bk). There are 24 nozzles for each of the colors Y, M, C, and 64 nozzles for the color Bk. With respect to the printing medium 105, the nozzles of the printhead 104 are arrayed in the sub-scan direction Y, which is perpendicular to the main-scan direction X.

The nozzles are arranged at a pitch of about 70 $\mu$m, which corresponds to a printing resolution of 360 dpi. Further, the printing resolution of the printer 100 is such that printing is performed at 720 dpi in the sub-scan direction. The printer 100 therefore controls the printing medium 105 in the sub-scan direction so as to obtain a printed image at a density that is twice the pitch at which the nozzles are arranged.

Next, the principal components of a printing system constituted by the printer 100 and a host device will be described with reference to FIG. 3.

Figure 3:
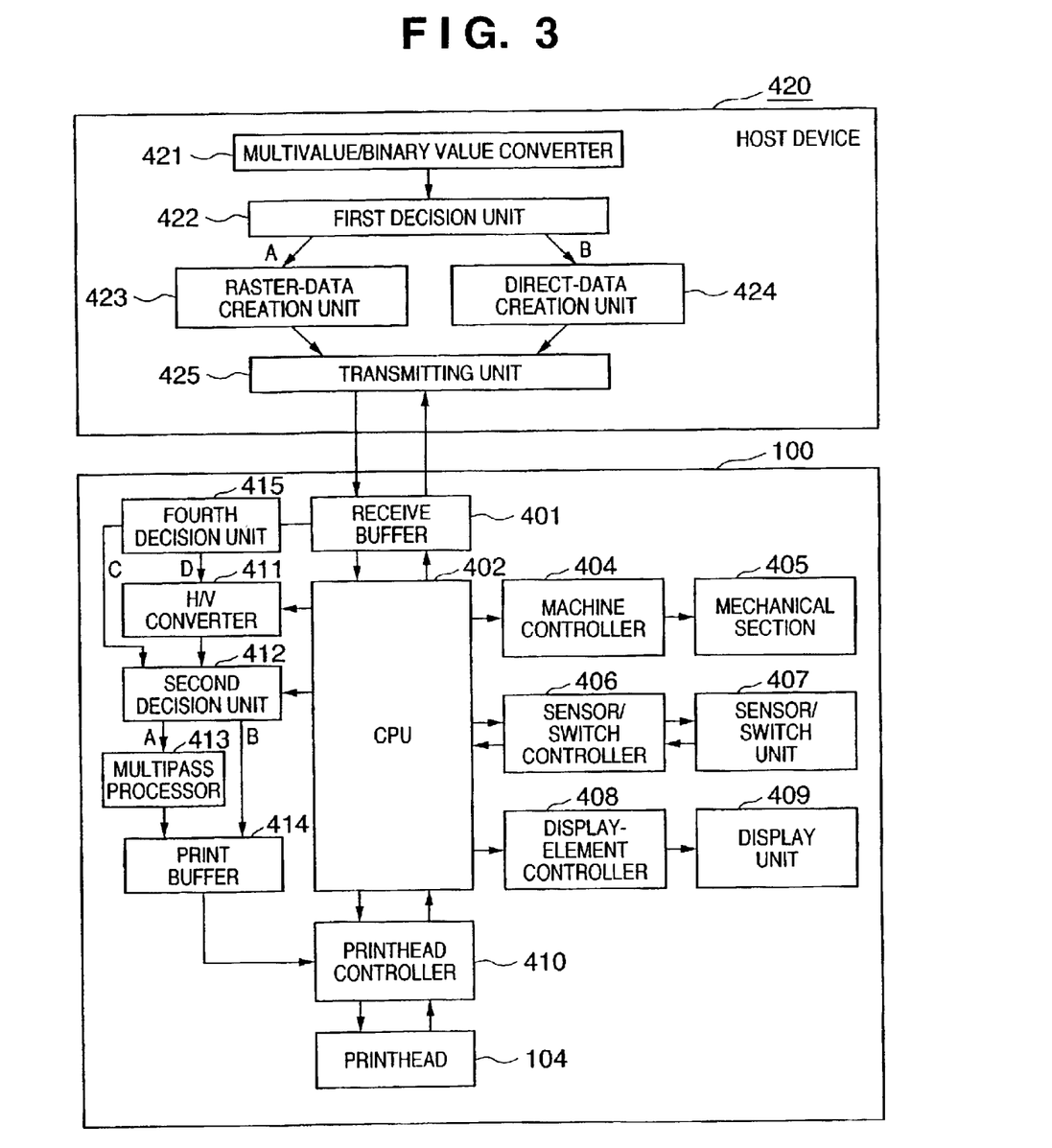
FIG. 3 is a block diagram illustrating the principal components of a printing system according to the first embodiment.

FIG. 3 is a block diagram showing the principal components of a printing system according to the first embodiment.

The system includes a host device 420 having a multivalue/binary value converter 421 for creating binary data, which corresponds to the four colors Y, M, C, Bk, as print data. A first decision unit 422 decides whether raster data or direct data is to be created. If raster data is to be created, this is performed by a raster-data creation unit 423. If direct data is to be created, on the other hand, then this is performed by a direct-data creation unit 424.

A data flag indicating the type of data (raster data or direct data) created by the raster-data creation unit 423 or direct-data creation unit 424 is generated and the flag is attached to the beginning of the corresponding raster data or direct data.

The mode for creating the raster data shall be referred to as the "raster mode", and the mode for creating the direct data shall be referred to as the "direct mode". The host device 420 is adapted so as to be capable of switching between these two modes.

The raster data is data obtained by arraying character or image data, which is to be printed, one raster at a time successively in the horizontal direction. Accordingly, the data is arrayed at the resolution of the print data irrespective of the resolution of the printhead 104. Further, the raster data needs to be applied to an H/V conversion processing as post processing.

On the other hand, the direct data is data obtained by extracting data that corresponds to each nozzle of the row of nozzles arrayed on the printhead 104 and arraying this data column by column successively in the vertical direction. Therefore, the direct data does need to be applied to an H/V conversion processing. Further, an H/V conversion processing flag indicating that the H/V conversion processing has been executed is attached to the beginning of the raster data that has undergone the H/V conversion. In this case, the beginning of the direct data is provided with the corresponding data flag and the H/V conversion processing flag.

A transmitting unit 425 manages data transmitted to the printing apparatus 100. The transmitting unit 425 sends the printing apparatus 100 print data comprising raster data or direct data, which consists of character or image data, and the data flag indicative of raster data or direct data. Further, the transmitting unit 425 receives confirmation data, which is for confirming whether print data has been transferred normally, and status data, which gives notification of the operating status of the printing apparatus 100, from the printing apparatus 100.

When the first decision unit 422 decides that the data to be created is "A", namely raster data, this is a case where the processing capability of the host device 420 is comparatively low. On the other hand, when the first decision unit 422 decides that the data to be created is "B", namely direct data, this is a case where the processing capability of the host device 420 is comparatively high. The determination as to whether the processing capability of the host device 420 is high or low is made based upon, e.g., the form of CPU with which the host device 420 is equipped and the clock frequency of the CPU. In particular, in the first embodiment, processing capability is judged to be high when the operating clock frequency of a Pentium 2 (registered trademark) CPU, which is manufactured by Intel Corporation, is 166 MHz or greater.

If the result of this determination is that the processing capability of the host device 420 is comparatively high, then selectively processing direct data, namely print data corresponding to the nozzles used in the printhead 104, and transmitting this data to the printing apparatus 100 is preferred in that this will make it unnecessary for the printing apparatus 100 to subsequently perform multipass print processing. This is preferable because the processing speed of the overall printing system is raised. More specifically, the printing resolution of the printing apparatus 100 is 720 dpi but the pitch at which the nozzles of the printhead 104 are arranged is 360 dpi. This means that interlace printing would be required with at least two multipass printing operations. In the direct mode, the host device executes processing for extracting print data printed by a single main scan in conformity with this interlace printing.

The timing of the determination made by the first decision unit 422 may be on a per-page or per-job basis of images to be printed, by way of example.

The host device 420, which is be implemented by a general-purpose computer such as a personal computer or workstation, has the standard components (e.g., a CPU, RAM, ROM, hard-disk drive, external storage device, network interface, display, keyboard and mouse, etc.) with which a general-purpose computer is equipped. However, this does not impose a limitation upon the invention, and any components may be used so long as they are capable of implementing the invention. Further, the components shown in FIG. 3 may be implemented by having the CPU execute a program stored in the internal ROM of the host device 420 or in the external storage device, or by special-purpose hardware.

The printing apparatus 100 includes a receive buffer 401 in which print data from the host device 420 is stored. The printing apparatus has a fourth decision unit 415 for deciding whether print data received by the receive buffer 401 has undergone the H/V conversion. This decision is rendered based upon whether the print data contains the H/V processing flag. If it is judged that the H/V conversion has been made ("C"), the print data is sent to the second decision unit 412.

If it is judged that the H/V conversion has not been made ("D"), then the print data is sent to the H/V converter 411. Under the management of the CPU 402, the print data is processed by an H/V converter 411. Specifically, the H/V converter 411 converts the print data, which has been sent to the printing apparatus 100 in horizontal form, to print data in vertical form in order to conform to the vertically arrayed row of nozzles of the printhead 104.

Next, a second decision unit 412 determines whether the received print data is raster data or direct data. This determination is made based upon the data flag contained in the print data. When the second decision unit 412 decides that the data is "A", namely raster data, the data is delivered to a multipass processor 413. The latter executes processing to create multipass data for performing multipass printing, which completes the printing of an image in a prescribed area on the printing medium by a printing operation carried out multiple times. When the second decision unit 412 decides that the data is "B", namely direct data, on the other hand, the direct data is transmitted directly from the second decision unit 412 to a print buffer 414 without traversing the multipass processor 413.

The print buffer 414 is a memory that stores print data so that the printhead 104 can make at least one main scan. The print data is stored in an array in which it can be transferred to and printed by the printhead 104 as is. The print data in the print buffer 414 is transferred to the printhead 104 by a printhead controller 410, whereby text or an image is printed on the printing medium 105.

The printhead controller 410 detects environmental information concerning the printhead 104, such as temperature information indicative of the status of the printhead, and transmits this information to the CPU 402. The printhead 104 is controlled based upon control information, which is generated by the CPU 402 based upon the environmental information.

A machine controller 404 controls the driving of a mechanical section 405, such as a carriage motor and line-feed motor, in response to a command from the CPU 402.

A sensor/switch controller 406 sends the CPU 402 a signal from a sensor/switch unit 407, which comprises various sensors and switches on the control console 108. Further, a display-element controller 408 is so adapted as to control a display unit 409, which comprises LEDs or liquid crystal display elements of a group of display panels on the control console 108.

Thus, the printing system according to the first embodiment determines, based upon the processing capability of the host device 420, whether the data to be printed is processed as raster data or direct data and transmits the data to the printing apparatus 100, thereby making it possible to raise the processing speed of the overall system.

Processing executed by the printing system of the first embodiment will now be described with reference to FIG. 4.

Figure 4:
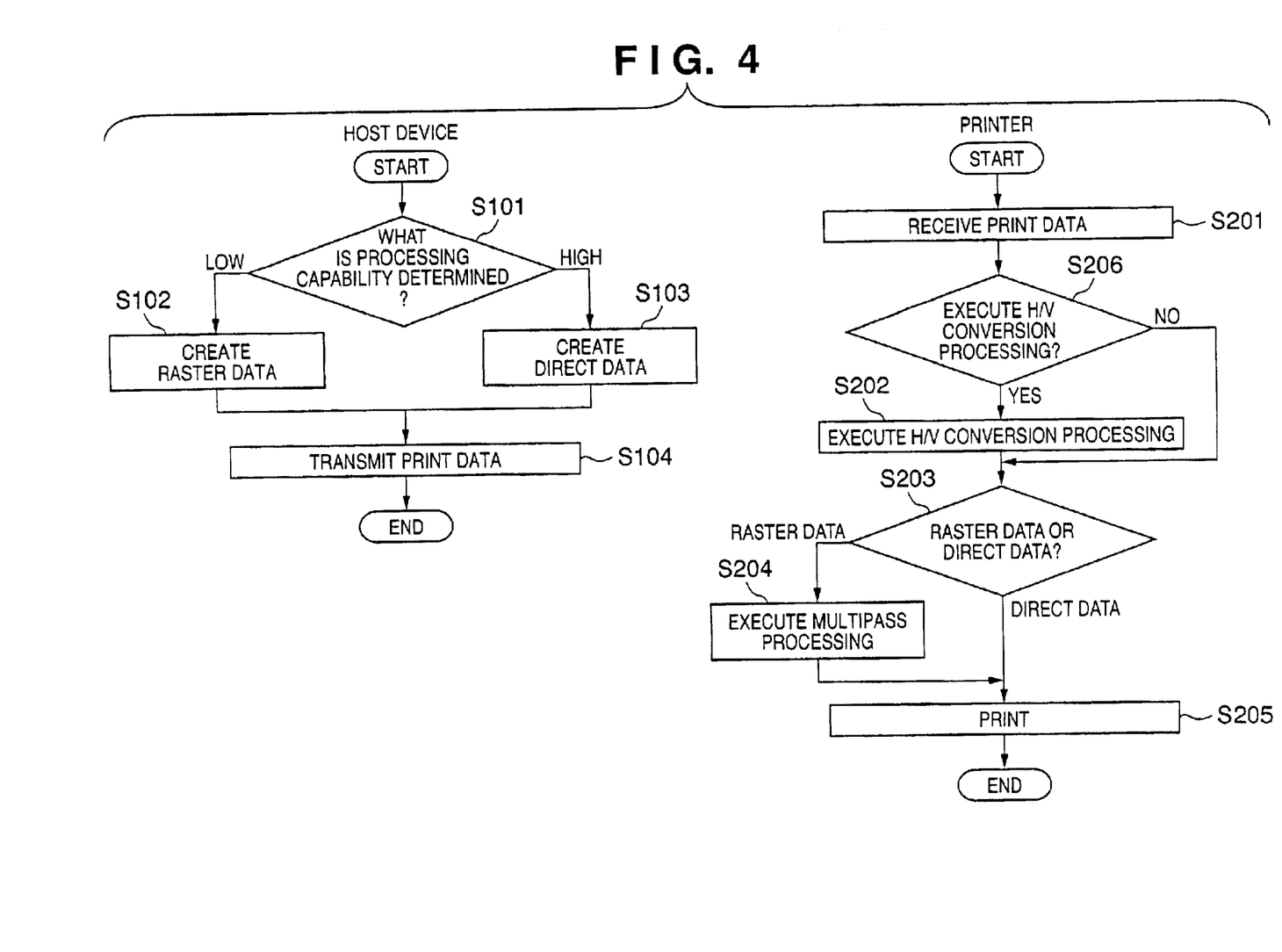
FIG. 4 is a flowchart illustrating processing executed by the printing system of the first embodiment.

FIG. 4 is a flowchart illustrating processing executed by the printing system of the first embodiment.

The flowchart on the left side of FIG. 4 is processing executed by the host device 420, and the flowchart on the right side is processing executed by the printing apparatus 100.

The host device 420 judges its processing capability by the first decision unit 422 at step S101. In the case of a low processing capability, i.e., in a case where the operating clock frequency of the CPU in the host device 420 is less than a predetermined clock frequency (166 MHz in the first embodiment), control proceeds to step S102. Here the raster-data creation unit 423 creates raster data, page by page of the print image in printer 100, from data that has entered from the multivalue/binary value converter 421, as well as a data flag corresponding to this raster data. Though the raster data is created page by page in this example, the data may be created on a per-job basis, where a job entails printing a plurality of pages at one time.

If the decision rendered at step S101 is that the processing capability is high, i.e., that the operating clock frequency of the CPU in host device 420 is equal to or greater than a prescribed clock frequency, then control proceeds to step S103. Here the direct-data creation unit 424 creates direct data, page by page of the print image in printer 100, from data that has entered from the multivalue/binary value converter 421, as well as a data flag corresponding to this raster data.

Next, at step S104, the transmitting unit 425 sends the printer 100 the print data, which is the raster data and corresponding data flag created by the raster-data creation unit 423 or the direct data and corresponding data flag created by the direct-data creation unit 424.

Meanwhile, print data transmitted from the host device 420 is received by the receive buffer 401 in the printer 100 at step S201. The fourth decision unit 415 in the printing apparatus 100 determines at step S206 whether the print data contains the H/V conversion processing flag. If the print data does contain the H/V conversion processing flag, control proceeds to step S203.

On the other hand, if it is determined at step S206 that the print data does not contain the H/V conversion processing flag, control proceeds to step S202. This is followed by step S202, at which the received print data is subjected to the H/V conversion by the H/V converter 411.

Then, at step S203, the second decision unit 412 determines whether the print data is raster data or direct data based upon the data flag contained in the print data. If the print data is raster data, control proceeds to step S204, at which the multipass processor 413 creates multipass data from the raster data obtained by the H/V conversion and transmits the multipass data to the print buffer 414.

If the decision rendered at step S203 is that the print data is direct data, then the direct data obtained by the H/V conversion is transmitted to the print buffer 414.

Using the print data that has been stored in the print buffer 414, the printhead controller 410 causes the printhead 104 to perform printing at step S205.

In accordance with the first embodiment, as described above, the host device 420 creates raster data or direct data as print data based upon the processing capability of the host device 420 and transmits this data to the printing apparatus 100. In other words, the host device 420 can create print data suited to its own processing capability. As a result, the load imposed upon the host device 420 to create print data is alleviated, thereby making it possible to raise the processing efficiency of the overall printing system comprising the host device 420 and printing apparatus 100.

Further, in a case where direct data is created and transmitted to the printing apparatus 100, it is unnecessary for multipass processing to be executed within the printing apparatus 100. As a result, the print buffer 414 serving as a memory within the printing apparatus 100 can be utilized efficiently.

Furthermore, by executing the H/V conversion processing within the printing apparatus 100, the processing speed of the overall printing system can be raised even with a host device 420 having a comparatively low processing capability.

(Second Embodiment)

In the first embodiment, the arrangement is such that the printing apparatus 100 executes the H/V conversion processing of the print data received from the host device 420. In the second embodiment, however, it is so arranged that whether the H/V conversion processing is executed by the host device 420 or printing apparatus 100 is determined. This will now be described.

Figure 5:
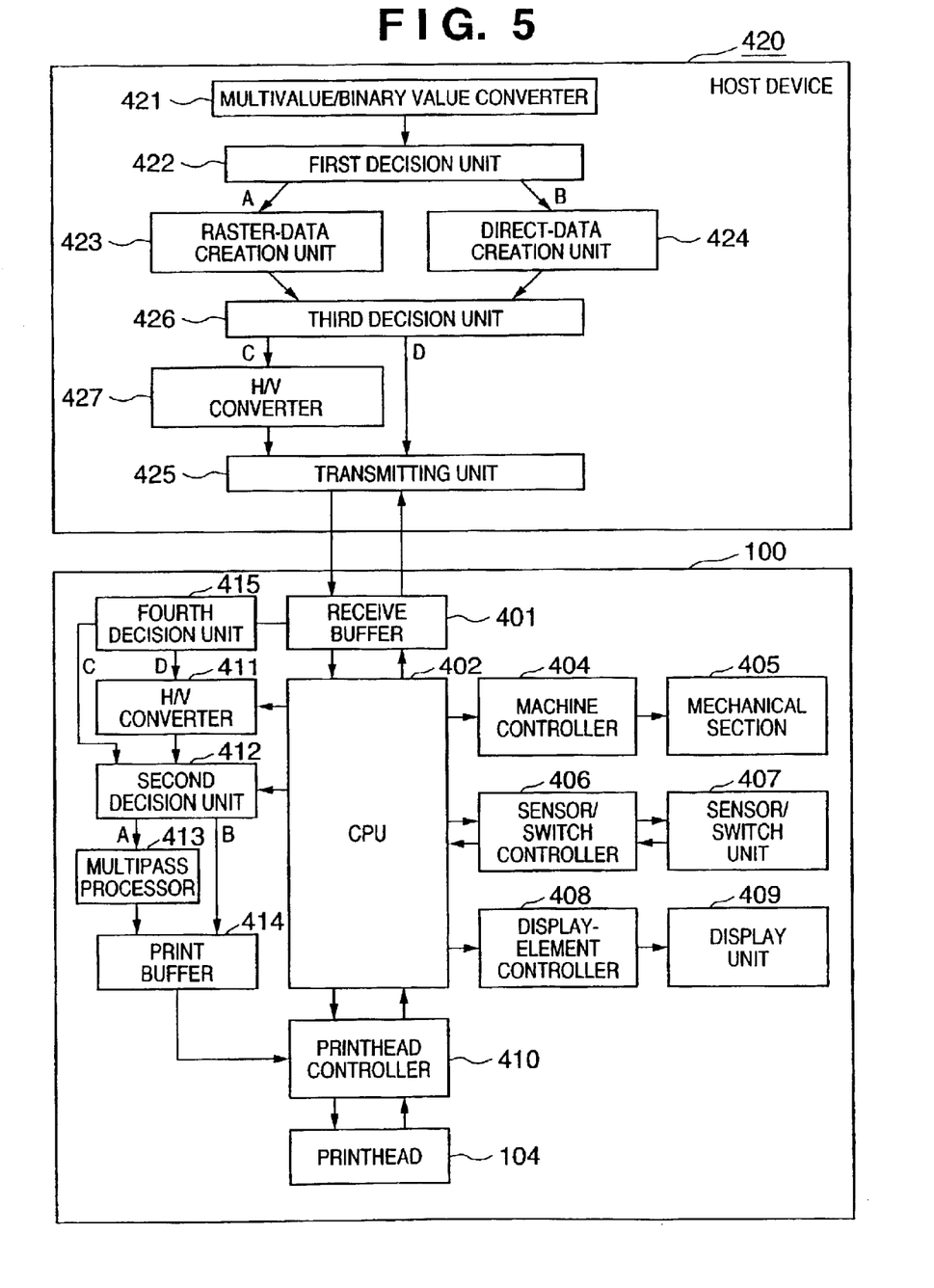
FIG. 5 is a block diagram illustrating the principal components of a printing system according to a second embodiment of the present invention.

FIG. 5 is a block diagram illustrating the principal components of a printing system according to the second embodiment, in which components identical with those of the printing system of the first embodiment are designated by like reference characters and need not be described again in detail.

The host device 420 has a third decision unit 426 for deciding whether the H/V conversion processing is to be performed by the host device 420. If the decision rendered is that the host device 420 is to perform the H/V conversion, then an H/V converter 427 in the host device 420 applies H/V conversion processing to raster data created by the raster-data creation unit 423. An H/V conversion processing flag indicating that the H/V conversion processing has been executed is attached to the beginning of the raster data that has undergone the H/V conversion. In this case, the beginning of the raster data or direct data is provided with the corresponding data flag and the H/V conversion processing flag.

The transmitting unit 425 sends the printing apparatus 100 print data that includes raster data or direct data obtained by the H/V conversion, or print data that includes raster data created by the raster-data creation unit 423 or direct data created by the direct-data creation unit 424.

When the third decision unit 426 decides "C", namely that the H/V conversion processing is to be performed by the host device 420, this is a case where the processing capability of the host device 420 is comparatively high. On the other hand, when the third decision unit 426 decides "D", namely that the H/V conversion processing is not to be performed by the host device 420, this is a case where the processing capability of the host device 420 is comparatively low. The determination as to whether the processing capability of the host device 420 is high or low is made based upon, e.g., the form of CPU with which the host device 420 is equipped and the clock frequency of the CPU. In particular, in the second embodiment, processing capability is judged to be high when the operating clock frequency of a Pentium 2 (registered trademark) CPU, which is manufactured by Intel Corporation, is 233 MHz or greater.

If the result of this determination is that the processing capability of the host device 420 is comparatively high, then transmitting the print data to the printing apparatus 100 after subjecting the data to H/V conversion processing is preferred in that this will make it unnecessary for the printing apparatus 100 to subsequently perform H/V conversion processing. This is preferable because the processing speed of the overall printing system is raised.

Processing executed by the printing system of the second embodiment will now be described with reference to FIG. 6.

Figure 6:
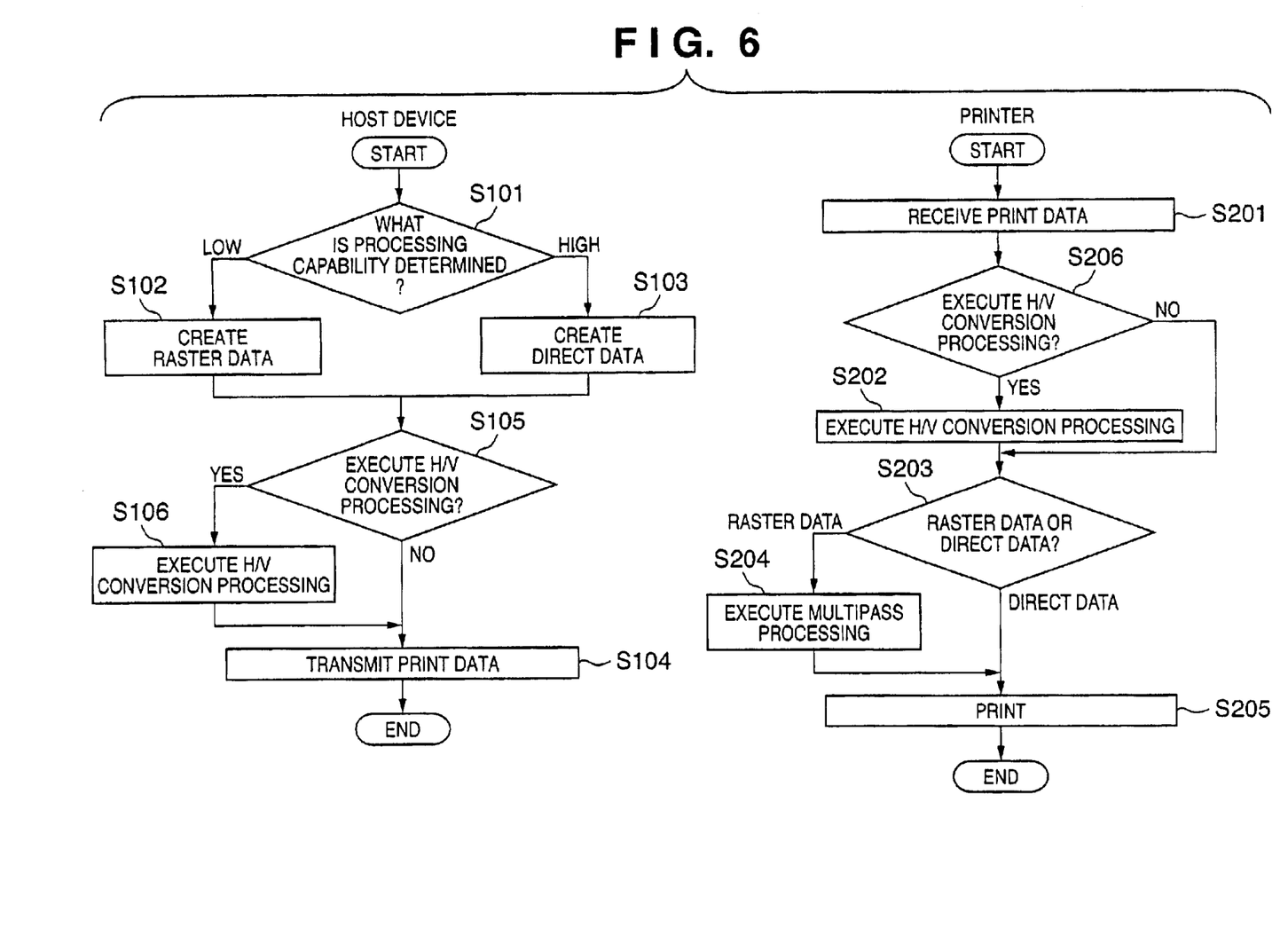
FIG. 6 is a flowchart illustrating processing executed by the printing system of the second embodiment.

FIG. 6 is a flowchart showing processing executed by the printing system of the second embodiment.

The flowchart on the left side of FIG. 6 is processing executed by the host device 420, and the flowchart on the right side is processing executed by the printing apparatus 100. Processing steps identical with those of the flowchart of FIG. 4 according to the first embodiment are designated by like step numbers and need not be described again in detail.

At step S105 in FIG. 6, the host device 420 judges its processing capability by the third decision unit 426. In the case of a low processing capability, i.e., in a case where the operating clock frequency of the CPU in the host device 420 is less than a predetermined clock frequency (166 MHz in the second embodiment), control proceeds to step S104 without H/V conversion processing being executed.

If the decision rendered at step S105 is that the processing capability is high, i.e., that the operating clock frequency of the CPU in host device 420 is equal to or greater than a prescribed clock frequency, then control proceeds to step S106. Here the H/V converter 427 applies H/V conversion processing to raster data created by the raster-data creation unit 423 and creates an H/V conversion processing flag. Control then proceeds to step S104.

On the other hand, in the printing apparatus 100, steps 201–206 of the flowchart of FIG. 4 according to the first embodiment are performed on the basis of print data transferred from the host device 420.

Thus, in accordance with the second embodiment, as described above, effects in addition to those described in the first embodiment are obtained. Specifically, print data is transmitted to the printing apparatus 100 after the data is subjected to the H/V conversion processing by the host device 420, as a result of which the processing speed of the overall printing system can be raised even with a printing apparatus 100 having a comparatively low processing capability.

Figure 7A:
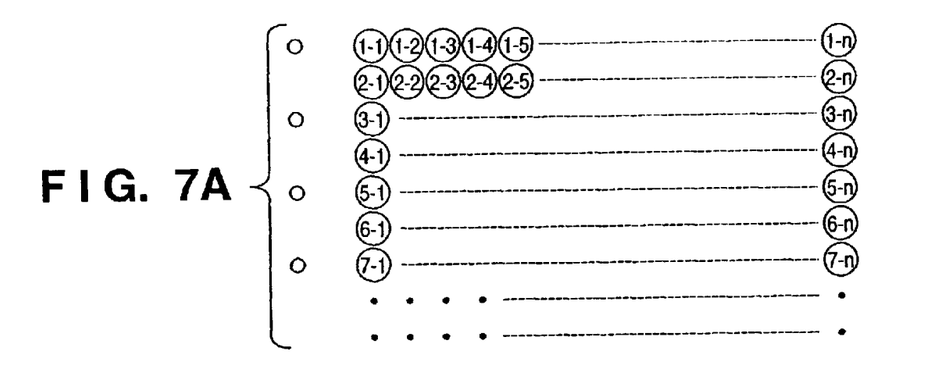
FIGS. 7A to 7C are diagrams useful in describing an example of the composition of print data in the process of being transferred from a host device to a printer in the first or second embodiment of the invention.
Figure 7B:
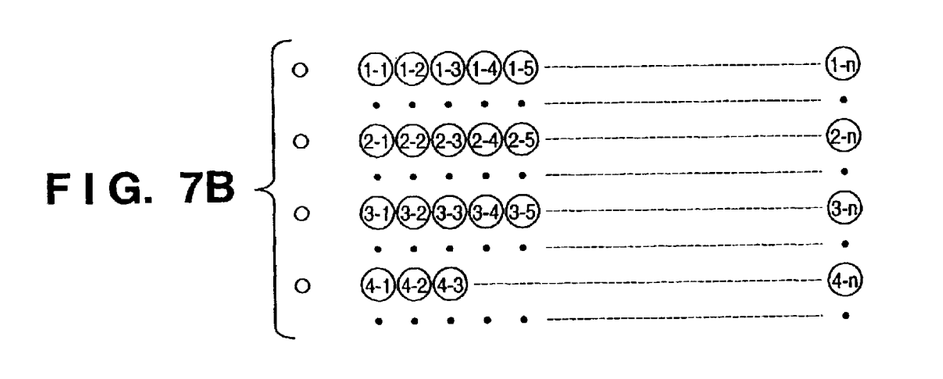
Figure 7C:
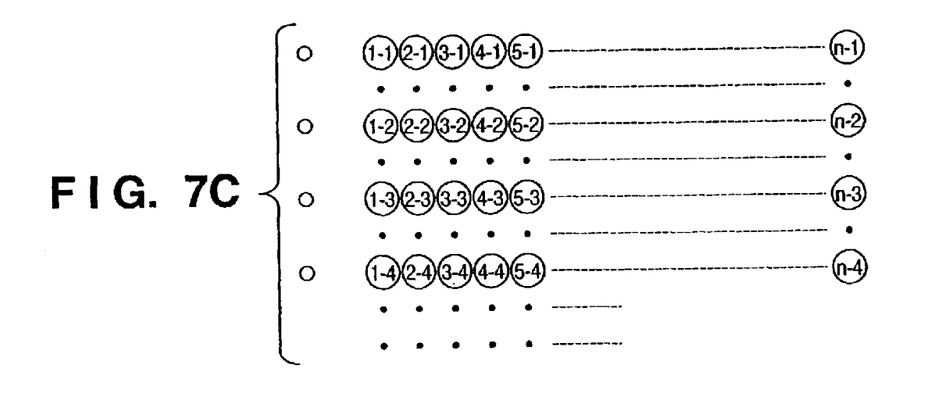

Finally, reference will be had to FIGS. 7A to 7C to describe an example of the composition of print data in the process of being transferred from the host device 420 to the printer in the first or second embodiment of the invention.

In order to simplify the description, FIG. 7 illustrates a case where the printhead 104 has four nozzles. Further, the nozzle pitch of the printhead 104 is 360 dpi, printing density in the main-scan direction is 720 dpi and printing density in the sub-scan direction is 720 dpi. As a result, an actual image is formed by at least two multipasses.

In FIGS. 7A to 7C, the numbers indicate the array of data in the print buffer 414, and the black dots indicate the positions of data that will be arrayed in the print buffer 414 in time.

FIG. 7A illustrates a data array in a case where the host device 420 creates raster data as print data and the H/V conversion is performed by the printing apparatus 100. Here the print data is transferred to the printing apparatus 100 upon being arrayed successively in the raster (horizontal) direction in correspondence with the data per se that forms the character or image.

FIG. 7B illustrates a data array in a case where the host device 420 creates raster data as print data. Here the print data is transferred to the printing apparatus 100 upon being arrayed successively in the raster (horizontal) direction in correspondence with the data formed every main scan of the printhead 104.

FIG. 7C illustrates a data array in a case where the host device 420 creates direct data as print data by the host device 420. Here the print data is transferred to the printing apparatus 100 upon being arrayed successively in the column (vertical) direction in correspondence with the data formed every main scan of the printhead 104.

(Third Embodiment)

The second embodiment has been described with regard to an example in which raster data or direct data is created by the host device 420, based upon the processing capability thereof, as print data transmitted to the printer 100. However, this does not impose a limitation upon the present invention.

For example, in a situation where the printer 100 has printing modes of a plurality of types and the host device 420 can designate the printing mode to be used, it may be so arranged that raster data or direct data to be transmitted to the printer 100 is created by the host device 420 based upon the printing mode designated.

It should be noted that the printing mode may be designated by the user employing a keyboard or mouse via a GUI (Graphical User Interface) generated by a printer driver for the printer 100 installed in the host device 420 or by a special-purpose application. Alternatively, the type of image to be printed (character image or photographic image, etc.) may be discriminated and the printing mode designated based upon the discriminated image type. In such case a high-speed printing mode would be designated if a character image has been discriminated and a low-speed printing mode if a photographic image has been discriminated.

Furthermore, in a case where the printing mode can be designated using the control console of the printer 100 and the designated printing mode can be reported to the host device 420, the host device 420 may designate the printing mode of which it has been notified by the printer 100.

The details of processing according to the third embodiment will now be described.

By way of example, in a case where the printer 100 has high- and low-speed printing modes as its printing modes, the host device 420 creates raster data as the print data if the high-speed printing mode has been designated and direct data as the print data if the low-speed printing mode has been designated.

The high-speed printing mode results in a printing quality that is inferior to that of the low-speed printing mode. Further, the printing resolution in the high-speed printing mode is, e.g., 360×360 dpi, and that in the low-speed printing mode is, e.g., 720×720 dpi.

The high-speed printing mode features superior printing speed, a comparatively low printing resolution and a comparatively low printing quality as well. The amount of print data, therefore, is comparatively small. In this case, therefore, the host device 420 creates the raster data as the print data.

On the other hand, the low-speed printing mode features superior printing quality, a higher printing resolution and a higher printing quality as well. The amount of print data, therefore, is comparatively large. In this case, therefore, the host device 420 creates the direct data as the print data in order to use the print buffer 414 of the printer 100 more economically.

In addition, it may be so arranged that the host device 420 determines whether to execute H/V conversion processing or not based upon the printing mode designated by the host device 420.

For example, since the amount of print data created is small in a case where the high-speed printing mode is designated, the H/V conversion is performed by the host device 420. As a result, the printer 100 can devote itself solely to the printing of the print data received from the host device 420 without executing image processing such as the H/V conversion processing and multipass processing.

On the other hand, since the amount of print data created is large in a case where the low-speed printing mode is designated, the printing of the print data by the printer 100 takes a comparatively long period of time. This means that the throughput of the printer 100 is unaffected even if the printer executes the H/V conversion processing of the print data. Accordingly, in this case the printer 100 performs the H/V conversion and the host device 420 does not.

Thus, in accordance with the third embodiment as described above, if the printer 100 has printing modes of a plurality of types, the host device 420 creates raster data or direct data as the print data in dependence upon the printing mode used by the printer 100. Further, the H/V conversion is performed in dependence upon the printing mode. As a result, print data (raster data or direct data) that is optimum for the print mode can be transmitted by the printer 100, thereby making it possible to raise the processing speed of the overall printing system.

In the third embodiment, a case in which the printer 100 has the high-speed printing mode and low-speed printing mode as its printing modes is described. However, this does not impose a limitation upon the present invention. For example, depending upon the specifications of the printer 100, modes in addition to the above-described printing modes are conceivable, these being high- and low-quality printing modes or high- and low-resolution printing modes, etc.

In such case the host device 420 would create raster data in case of the low-quality printing mode, in which a small amount of print data suffices, and direct data in the high-quality printing mode, in which the amount of print data is greater.

Further, the host device 420 would create raster data in case of the low-resolution printing mode, in which a small amount of print data suffices, and direct data in the high-resolution printing mode, in which the amount of print data is greater.

Three embodiments, namely the first to third embodiments, have been described as embodiments of the present invention. However, various combinations of functions [processing capability, image processing functions (a H/V conversion processing function and multipass processing function, etc.) and printing modes] possessed by the host device 420 and printer 100 are conceivable. It goes without saying, therefore, that the intended processing can be achieved by combining the first to third embodiments as desired in accordance with the application and purpose.

In the foregoing embodiments, it is assumed that the liquid ejected from the printhead is ink, and that the liquid contained in the ink tank is ink. However, the content of the tank is not limited to ink. For example, in order to improve the fixation or water resistance of a printed image and raise the quality of the image, a substance such as a treating solution ejected toward the printing medium may be accommodated in the ink tank.

The foregoing embodiments are described in regard to a printing apparatus, particularly of the ink-jet printing type, equipped with means (e.g., an electrothermal transducer or laser beam generator) for generating thermal energy as the energy utilized to discharge ink, wherein a change in the state of the ink is brought about by this thermal energy, thereby making it possible to achieve high-density, high-definition printing. Further, the invention is not limited to a printhead of the above-mentioned type. For example, the printhead may be one that relies upon an ejection method utilizing piezoelectric elements.

With regard to a typical configuration and operating principle, it is preferred that the foregoing be achieved using the basic techniques disclosed in U.S. Pat. Nos. 4,723,129 and 4,740,796. This scheme is applicable to both so-called on-demand-type and continuous-type apparatus. Particularly, in the case of the on-demand type, at least one drive signal, which provides a sudden temperature rise that exceeds that for film boiling, is applied, in accordance with printing information, to an electrothermal transducer arranged to correspond to a sheet or liquid passageway holding a liquid (ink). As a result, thermal energy is produced in the electrothermal transducer to bring about film boiling on the thermal working surface of the printhead. Accordingly, air bubbles can be formed in the liquid (ink) in one-to-one correspondence with the drive signal.

Owing to growth and contraction of the air bubbles, the liquid (ink) is ejected through an orifice so as to form at least one droplet. If the drive signal has the form of a pulse, growth and contraction of the air bubbles can be made to take place rapidly and in appropriate fashion. This is preferred since it will be possible to achieve liquid (ink) ejection exhibiting excellent response.

Signals described in U.S. Pat. Nos. 4,463,359 and 4,345, 262 are suitable as drive pulses having this pulse shape. It should be noted that even better printing can be performed by employing the conditions described in U.S. Pat. No. 4,313,124, which discloses an invention relating to the rate of increase in the temperature of the above-mentioned thermal working surface.

In addition to the combination of the orifices, fluid passageways and electrothermal transducers (in which the fluid passageway is linear or right-angled) disclosed as the construction of the printhead in each of the above-mentioned specifications, an arrangement using the art described in U.S. Pat. Nos. 4,558,333 and 4,459,600, which disclose elements disposed in an area in which the thermal working portion is curved, may be employed. Further, it is possible to adopt an arrangement based upon Japanese Patent Application Laid-Open No. 59-123670, which discloses a configuration having a common slot for the ink ejecting portion of a plurality of electrothermal transducers, or Japanese Patent Application Laid-Open No. 59-138461, which discloses a configuration having openings made to correspond to the ink ejecting portions, wherein the openings absorb pressure waves of thermal energy.

As a printhead of the full-line type having a length corresponding to the maximum width of the printing medium capable of being printed on by the printing apparatus, use can be made of an arrangement in which the length is satisfied by a combination of multiple printheads of the kind disclosed in the foregoing specifications, or an arrangement in which printheads serve as a single integrally formed printhead.

The printhead may not only be of the cartridge type, in which the printhead itself is integrally provided with an ink tank, but also of the replaceable chip-type, in which the electrical connection to the apparatus proper and the supply of ink from the apparatus proper can be achieved by mounting the head on the apparatus proper.

It is preferred that the printing apparatus described above be additionally provided with printhead recovery means and auxiliary means, etc., in order to make the printing operation much more stable. Specific examples that can be mentioned are printhead capping means, cleaning means, pressurizing or suction means, and preheating means comprising an electrothermal transducer, a heating element separate from this transducer or a combination of the transducer and the heating element. Further, providing a pre-ejection mode for performing ejection of ink independently of printing also is effective in achieving stable printing.

Furthermore, the printing mode of the printing apparatus is not limited to one in which printing is performed using only a mainstream color such as black. The apparatus can be one which has at least a multiple-color mode in which printing is performed using multiple colors or a full-color mode in which printing is performed using mixed colors. This may be achieved by using an integrated printhead or by combining a plurality of printheads.

The embodiments set forth above are described on the assumption that ink is the fluid. The ink used may be one which solidifies at room temperature or lower, one which softens at room temperature or one which is a liquid at room temperature. In general, temperature control is performed in such a manner that ink viscosity will fall within a stable ink ejection range by adjusting the temperature of the ink itself so as to fall within a temperature range of no less than 30° C. to no greater than 70° C. Accordingly, it will suffice to use an ink liquefied when the printing signal is applied.

In order to positively prevent elevated temperature due to thermal energy by using this as the energy for converting the ink from the solid state to the liquid state, or in order to prevent evaporation of the ink, it is permissible to use an ink which solidifies when left standing but which is liquefied by application of heat. In any case, the present invention is applicable to a case where use is made of ink which is liquefied for the first time by thermal energy, such as an ink liquefied by application of thermal energy conforming to a printing signal and ejected as a liquid ink, or ink which has already begun to solidify at the moment it reaches the printing medium.

In such case, inks may be used in a form in which they oppose the electrothermal transducer in a state in which they are held as a liquid or solid in the recesses or through-holes of a porous sheet, as described in Japanese Patent Application Laid-Open Nos. 54-56847 and 60-71260. In the present invention, the most effective method of dealing with these inks is the above-described method of film boiling.

Furthermore, there are cases where the object of the invention is attained also by supplying a software program (a program corresponding to the flowcharts shown in FIGS. 4 and 6 of the foregoing embodiments), which implements the functions of the foregoing embodiments, directly or remotely to a system or apparatus, reading the supplied program codes with a computer of the system or apparatus, and then executing the program codes. In this case, so long as the system or apparatus has the functions of the program, the mode of implementation need not rely upon a program.

Accordingly, since the functions of the present invention are implemented by computer, the program codes per se installed in the computer also implement the present invention. In other words, the claims of the present invention also cover a computer program that is for the purpose of implementing the functions of the present invention.

In this case, so long as the system or apparatus has the functions of the program, the form of the program, e.g., object code, a program executed by an interpreter or print data supplied to an operating system, etc., does not matter.

Examples of storage media that can be used for supplying the program are a floppy disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, the client computer can be connected to a website on the Internet using a browser possessed by the client computer, and the computer program per se of the present invention or an automatically installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer also is covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to run the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiment can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus for outputting print data to a printing apparatus that forms an image using a printhead having a plurality of nozzles disposed in a sub-scan direction, comprising:
   creating means for creating either raster data corresponding to a print raster or column data corresponding to nozzles in the sub-scan direction used on the printhead of the printing apparatus, as print data delivered to the printing apparatus, based upon a designated printing mode of the printing apparatus; and
   transmitting means for transmitting the print data, which has been created by said creating means, to the printing apparatus.

2. The apparatus according to claim 1, wherein printing modes include a high-speed printing mode and a low-speed printing mode, and
   said creating means creates the raster data if the high-speed printing mode has been designated and the column data if the low-speed printing mode has been designated.

3. The apparatus according to claim 2, wherein the print data includes a data flag indicative of the raster data or column data.

4. The apparatus according to claim 1, wherein printing modes include a high-quality printing mode and a low-quality printing mode, and
   said creating means creates the raster data if the low-quality printing mode has been designated and the column data if the high-quality printing mode has been designated.

5. The apparatus according to claim 1, wherein printing modes include a high-resolution printing mode and a low-resolution printing mode, and
   said creating means creates the raster data if the low-resolution printing mode has been designated and the column data if the high-resolution printing mode has been designated.

6. The apparatus according to claim 1, wherein said creating means creates the print data, which is either the raster data or column data, on a per-page or per-job basis of images to be printed.

7. The apparatus according to claim 1, further comprising converting means for subjecting the print data to a horizontal-to-vertical conversion based upon the designated printing mode of the printing apparatus.

8. The apparatus according to claim 7, wherein printing modes include a high-speed printing mode and a low-speed printing mode, and
   said converting means subjects the print data to the horizontal-to-vertical conversion if the high-speed printing mode has been designated.

9. An information processing apparatus for outputting print data to a printing apparatus that forms an image using a printhead having a plurality of nozzles disposed in a sub-scan direction, comprising:
   creating means for creating either raster data corresponding to a print raster or column data corresponding to nozzles in the sub-scan direction use on the printhead of the printing apparatus, as print data delivered to the printing apparatus, based upon a processing capability of said information processing apparatus; and
   transmitting means for transmitting the print data, which has been created by said creating means, to the printing apparatus.

10. The apparatus according to claim 9, wherein the processing capability is an operating clock frequency of a CPU within said information processing apparatus.

11. The apparatus according to claim 9, wherein said creating means creates the column data if the operating clock frequency of the CPU of said information processing apparatus is equal to or greater than a first predetermined clock frequency.

12. The apparatus according to claim 9, further comprising converting means for subjecting the print data to a horizontal-to-vertical conversion based upon the processing capability of said information processing apparatus.

13. The apparatus according to claim 12, wherein if the operating clock frequency of the CPU of said information processing apparatus is equal to or greater than a second predetermined clock frequency, said converting means subjects the print data, which has been created by said creating means, to the horizontal-to-vertical conversion.

14. A printing apparatus for forming an image using a printhead, which has a plurality of nozzles disposed in a sub-scan direction, based upon print data output from an information processing apparatus, comprising:

receiving means for receiving raster data corresponding to a print raster or column data corresponding to nozzles in the sub-scan direction used on the printhead of said printing apparatus, as print data from the information processing apparatus;

determination means for determining whether the print data is raster data or column data; and printing means for performing printing based upon multipass data, which is obtained by applying multipass processing to the raster data, if the determination made by said determination means is that the print data is raster data, and performing printing based upon the column data if the determination made by said determination means is that the print data is column data.

15. The apparatus according to claim 14, wherein the print data includes a horizontal-to-vertical conversion flag indicating whether a horizontal-to-vertical conversion has been executed, and said apparatus further comprises:

converting means for subjecting the print data, which has been received by said receiving means, to a horizontal-to-vertical conversion based upon absence or presence of the horizontal-to-vertical conversion flag.

16. A printing system comprising a printing apparatus for forming an image using a printhead, which has a plurality of nozzles disposed in a sub-scan direction, and an information processing apparatus for outputting print data to said printing apparatus, wherein said information processing apparatus comprises:

creating means for creating either raster data corresponding to a print raster or column data corresponding to nozzles in the sub-scan direction used on the printhead of said printing apparatus, as print data delivered to the printing apparatus, based upon a designated printing mode of said printing apparatus; and transmitting means for transmitting the print data, which has been created by said creating means, to said printing apparatus; and said printing apparatus comprising:

receiving means for receiving the print data from said information processing apparatus;

determination means for determining whether the print data is raster data or column data; and printing means for performing printing based upon multipass data, which is obtained by applying multipass processing to the raster data, if the determination made by said determination means is that the print data is raster data, and performing printing based upon the column data if the determination made by said determination means is that the print data is column data.

17. A printing system comprising a printing apparatus for forming an image using a printhead, which has a plurality of nozzles disposed in a sub-scan direction, and an information processing apparatus for outputting print data to said printing apparatus, wherein said information processing apparatus comprises:

creating means for creating either raster data corresponding to a print raster or column data corresponding to nozzles in the sub-scan direction used on the printhead of said printing apparatus, as print data delivered to said printing apparatus, based upon a processing capability of said information processing apparatus; and transmitting means for transmitting the print data, which has been created by said creating means, to said printing apparatus; and said printing apparatus comprises:

receiving means for receiving the print data from said information processing apparatus;

determination means for determining whether the print data is raster data or column data; and printing means for performing printing based upon multipass data, which is obtained by applying multipass processing to the raster data, if the determination made by said determination means is that the print data is raster data, and performing printing based upon the column data if the determination made by said determination means is that the print data is column data.

18. A method of controlling an information processing apparatus for outputting print data to a printing apparatus that forms an image using a printhead having a plurality of nozzles disposed in a sub-scan direction, comprising:

a creating step of creating either raster data corresponding to a print raster or column data corresponding to nozzles in the sub-scan direction used on the printhead of the printing apparatus, as print data delivered to the printing apparatus, based upon a designated printing mode of the printing apparatus; and a transmitting step of transmitting the print data, which has been created at said creating step, to the printing apparatus.

19. The method according to claim 18, wherein printing modes include a high-speed printing mode and a low-speed printing mode, and said creating step creates the raster data if the high-speed printing mode has been designated and the column data if the low-speed printing mode has been designated.

20. The method according to claim 18, wherein printing modes include a high-quality printing mode and a low-quality printing mode, and said creating step creates the raster data if the low-quality printing mode has been designated and the column data if the high-quality printing mode has been designated.

21. The method according to claim 18, wherein printing modes include a high-resolution printing mode and a low-resolution printing mode, and said creating step creates the raster data if the low-resolution printing mode has been designated and the column data if the high-resolution printing mode has been designated.

22. The method according to claim 18, wherein said creating step creates the print data on a per-page or per-job basis of images to be printed.

23. The method according to claim 18, wherein the print data includes a data flag indicative of the raster data or column data.

24. The method according to claim 18, further comprising a converting step of subjecting the print data to a horizontal-to-vertical conversion based upon the designated printing mode of the printing apparatus.

25. The method according to claim 24, wherein printing modes include a high-speed printing mode and a low-speed printing mode, and said converting step subjects the print data to the horizontal-to-vertical conversion if the high-speed printing mode has been designated.

26. A method of controlling an information processing apparatus for outputting print data to a printing apparatus that forms an image using a printhead having a plurality of nozzles disposed in a sub-scan direction, comprising:

a creating step of creating either raster data corresponding to a print raster or column data corresponding to nozzles in the sub-scan direction used on the printhead of the printing apparatus, as print data delivered to the printing apparatus, based upon a processing capability of the information processing apparatus; and a transmitting step of transmitting the print data, which has been created at said creating step, to the printing apparatus.

27. A method of controlling a printing apparatus for forming an image using a printhead, which has a plurality of nozzles disposed in a sub-scan direction, based upon print data output from an information processing apparatus, comprising:

a receiving step of receiving raster data corresponding to a print raster or column data corresponding to nozzles in the sub-scan direction used on the printhead of the printing apparatus, as print data from the information processing apparatus;

a determination step of determining whether the print data is raster data or column data; and a printing step of performing printing based upon multipass data, which is obtained by applying multipass processing to the raster data, if the determination made at said determination step is that the print data is raster data, and performing printing based upon the column data if the determination made by said determination step is that the print data is column data.

28. The method according to claim 27, wherein the print data includes a horizontal-to-vertical conversion flag indicating whether a horizontal-to-vertical conversion has been executed, and said method further comprises:

a converting step of subjecting the print data, which has been received at said receiving step, to a horizontal-to-vertical conversion based upon absence or presence of the horizontal-to-vertical conversion flag.

29. A program for causing a computer to control an information processing apparatus for outputting print data to a printing apparatus that forms an image using a printhead having a plurality of nozzles disposed in a sub-scan direction, said program comprising:

program code of a creating step of creating either raster data corresponding to a print raster or column data corresponding to nozzles in the sub-scan direction used on the printhead of the printing apparatus, as print data delivered to the printing apparatus, based upon a designated printing mode of the printing apparatus; and program code of a transmitting step of transmitting the print data, which has been created at said creating step, to the printing apparatus.

30. A program for causing a computer to control an information processing apparatus for outputting print data to a printing apparatus that forms an image using a printhead having a plurality of nozzles disposed in a sub-scan direction, said program comprising:

program code of a creating step of creating either raster data corresponding to a print raster or column data corresponding to nozzles in the sub-scan direction used on the printhead of the printing apparatus, as print data delivered to the printing apparatus, based upon a processing capability of the information processing apparatus; and program code of a transmitting step of transmitting the print data, which has been created at said creating step, to the printing apparatus.

31. A program for causing a computer to control a printing apparatus for forming an image using a printhead, which has a plurality of nozzles disposed in a sub-scan direction, based upon print data output from an information processing apparatus, said program comprising:

program code of a receiving step of receiving raster data corresponding to a print raster or column data corresponding to nozzles in the sub-scan direction used on the printhead of the printing apparatus, as print data from the information processing apparatus;

program code of a determination step of determining whether the print data is raster data or column data; and program code of a printing step of performing printing based upon multipass data, which is obtained by applying multipass processing to the raster data, if the determination made at said determination step is that the print data is raster data, and performing printing based upon the column data if the determination made at said determination step is that the print data is column data.

32. An information processing apparatus for outputting print data to a printing apparatus that forms an image using a printhead having a plurality of nozzles disposed in a sub-scan direction, comprising:

horizontal-to-vertical converting means for subjecting print data to a horizontal-to-vertical conversion based upon a processing capability of said information processing apparatus; and transmitting means for transmitting the print data, which has been subjected to the horizontal-to-vertical conversion by said horizontal-to-vertical converting means, to the printing apparatus.

33. An information processing apparatus for outputting print data to a printing apparatus that forms an image using a printhead having a plurality of nozzles disposed in a sub-scan direction, comprising:

creating means for creating either raster data corresponding to a print raster or column data corresponding to nozzles in the sub-scan direction used on the printhead of the printing apparatus, as print data delivered to the printing apparatus, based upon a processing capability of said information processing apparatus;

horizontal-to-vertical converting means for subjecting print data, which has been created by creating means, to a horizontal-to-vertical conversion; and transmitting means for transmitting the print data, which has been subjected to the horizontal-to-vertical conversion by said horizontal-to-vertical converting means, to the printing apparatus.

34. A method of controlling an information processing apparatus for outputting print data to a printing apparatus that forms an image using a printhead having a plurality of nozzles disposed in a sub-scan direction, comprising:

a horizontal-to-vertical converting step of subjecting print data to a horizontal-to-vertical conversion based upon a processing capability of the information processing apparatus; and a transmitting step of transmitting the print data, which has been subjected to the horizontal-to-vertical conversion at said horizontal-to-vertical converting step, to the printing apparatus.

35. A method of controlling an information processing apparatus for outputting print data to a printing apparatus that forms an image using a printhead having a plurality of nozzles disposed in a sub-scan direction, comprising:

a creating step of creating either raster data corresponding to print raster or column data corresponding to nozzles in the sub-scan direction used on the printhead of the printing apparatus, as print data delivered to the printing apparatus, based upon a processing capability of the information processing apparatus;

a horizontal-to-vertical converting step of subjecting print data, which has been created at said creating step, to a horizontal-to-vertical conversion; and a transmitting step of transmitting the print data, which has been subjected to the horizontal-to-vertical conversion at said horizontal-to-vertical converting step, to the printing apparatus.

36. A program for causing a computer to control an information processing apparatus for outputting print data to a printing apparatus that forms an image using a printhead having a plurality of nozzles disposed in a sub-scan direction, said program comprising:

program code of a horizontal-to-vertical converting step of subjecting print data to a horizontal-to-vertical conversion based upon a processing capability of the information processing apparatus; and program code of a transmitting step of transmitting the print data, which has been subjected to the horizontal-to-vertical conversion at said horizontal-to-vertical converting step, to the printing apparatus.

37. A program for causing a computer to control an information processing apparatus for outputting print data to a printing apparatus that forms an image using a printhead having a plurality of nozzles disposed in a sub-scan direction, said program comprising:

program code of a creating step of creating either raster data corresponding to a print raster or column data corresponding to nozzles in the sub-scan direction used on the printhead of the printing apparatus, as print data delivered to the printing apparatus, based upon a processing capability of the information processing apparatus;

program code of a horizontal-to-vertical converting step of subjecting print data, which has been created at said creating step, to a horizontal-to-vertical conversion; and program code of a transmitting step of transmitting the print data, which has been subjected to the horizontal-to-vertical conversion at said horizontal-to-vertical converting step, to the printing apparatus.

* * * * *

UNITED STATES PATENT AND TRADEMARK OFFICE
CERTIFICATE OF CORRECTION

PATENT NO. : 6,830,313 B2
DATED : December 14, 2004
INVENTOR(S) : Moriyama et al.

It is certified that error appears in the above-identified patent and that said Letters Patent is hereby corrected as shown below:

Column 1,
Line 39, "having" should read -- have --.
Line 54, "printing/apparatus" should read -- printing apparatus --.

Column 4,
Line 55, "is" should read -- can --.

Column 8,
Line 40, "had" should read -- made --.

Column 14,
Line 38, "use" should read -- used --.

Signed and Sealed this

Sixteenth Day of August, 2005

JON W. DUDAS
*Director of the United States Patent and Trademark Office*